(12) United States Patent
McClure

(10) Patent No.: US 6,640,827 B1
(45) Date of Patent: Nov. 4, 2003

(54) HOT TAPPING TOOL

(76) Inventor: Mark A. McClure, 415 Clifty Rd., Jamestown, KY (US) 42629

( * ) Notice: Subject to any disclaimer, the term of this patent is extended or adjusted under 35 U.S.C. 154(b) by 0 days.

(21) Appl. No.: 09/972,597

(22) Filed: Oct. 8, 2001

(51) Int. Cl.⁷ .......................... F16K 43/00; F16L 41/06; B32B 41/08; B32B 47/18
(52) U.S. Cl. .......................... 137/318; 30/92.5; 408/67; 408/102
(58) Field of Search .......................... 137/15.13, 15.14, 137/318; 30/92.5, 92; 408/67, 101, 102, 137, 138, 207

(56) References Cited

U.S. PATENT DOCUMENTS

| | | | | |
|---|---|---|---|---|
| 396,177 A | * | 1/1889 | Smith .......................... 137/318 |
| 447,001 A | * | 2/1891 | Brankey .......................... 137/318 |
| 2,188,607 A | | 1/1940 | Larry et al. |
| 2,287,354 A | * | 6/1942 | Misch .......................... 408/101 |
| 2,299,814 A | * | 10/1942 | Gale et al. .......................... 408/137 |
| 2,601,434 A | * | 6/1952 | Du Bois .......................... 137/318 |
| 2,767,600 A | * | 10/1956 | Mueller et al. .......................... 137/318 |
| 2,800,812 A | | 7/1957 | Mueller et al. |
| 2,899,983 A | * | 8/1959 | Farris .......................... 137/318 |
| 2,941,427 A | * | 6/1960 | Ver Nooy .......................... 408/67 |
| 2,966,814 A | * | 1/1961 | Mueller et al. .......................... 137/318 |
| 3,068,724 A | * | 12/1962 | Mueller .......................... 137/318 |
| 3,130,483 A | * | 4/1964 | Mueller et al. .......................... 137/318 |
| 3,580,270 A | * | 5/1971 | Leopold, Jr. et al. .......................... 137/318 |
| 3,779,272 A | | 12/1973 | Dunmire |
| 3,905,718 A | * | 9/1975 | Luckenbill et al. .......................... 137/318 |
| 3,995,655 A | | 12/1976 | Sands |
| 4,050,720 A | | 9/1977 | Reneau |
| 4,149,820 A | | 4/1979 | Newlin |
| 4,223,925 A | | 9/1980 | Reneau et al. |
| 4,332,272 A | | 6/1982 | Wendell |
| 4,431,017 A | | 2/1984 | Willemsen |
| 4,680,848 A | * | 7/1987 | Goldner .......................... 137/318 |
| 4,682,624 A | | 7/1987 | Turner |
| 4,902,174 A | | 2/1990 | Thompson et al. |
| 4,966,397 A | | 10/1990 | McKinnon |
| 5,044,393 A | | 9/1991 | Jiles |
| 5,058,620 A | | 10/1991 | Jiles |
| 5,303,602 A | | 4/1994 | Morgan |
| 5,439,331 A | | 8/1995 | Andrew et al. |
| 5,577,529 A | | 11/1996 | Katz |
| 5,590,676 A | * | 1/1997 | Wagner .......................... 138/318 |
| 5,660,199 A | | 8/1997 | Maichel |
| 5,676,171 A | * | 10/1997 | Heed .......................... 137/318 |
| 5,732,732 A | | 3/1998 | Gross et al. |
| 5,819,815 A | * | 10/1998 | Nickens et al. .......................... 137/318 |
| 5,832,966 A | | 11/1998 | Nickens et al. |
| 5,879,112 A | | 3/1999 | Ivey |
| 5,893,686 A | * | 4/1999 | Weiler .......................... 137/318 |
| 6,126,369 A | | 10/2000 | Jiles |
| 6,164,344 A | | 12/2000 | Nickens et al. |

OTHER PUBLICATIONS

For Drilling of 2" Access Fitting Assemblies Under Pressure, Cormon Hot Tap & Accessories, http://www.cormon.com/data/cmef012/cmef012.htm, May 4, 1998, pp. 1–2.
Hot Tap Tool for High Pressure (HP™ and MH™) Access Systems, http:/www.alspi.com/hottap.htm, May 4, 1998, pp. 1–3.

* cited by examiner

Primary Examiner—George L. Walton
(74) Attorney, Agent, or Firm—Stites & Harbison, PLLC; Vance A. Smith; David W. Nagle, Jr.

(57) ABSTRACT

A hot tapping tool having a stationary tubular member threadedly engaged to a movable tubular member adapted for rotational and axial movement with respect to the stationary member with said movable tubular member operably connected to a shaft having cutter head and causing said shaft to move axially toward and away from a pipe line to be cut.

3 Claims, 4 Drawing Sheets

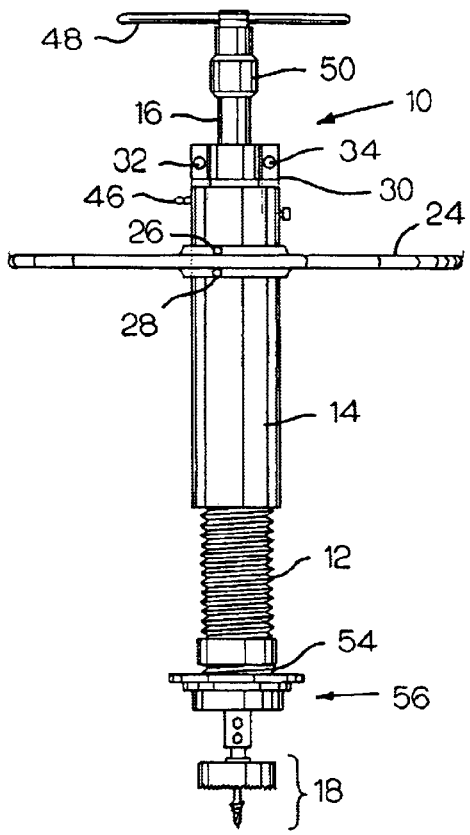
FIG. 1
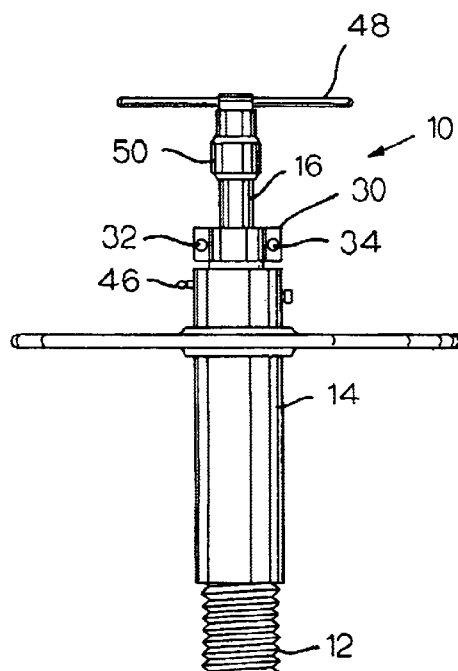
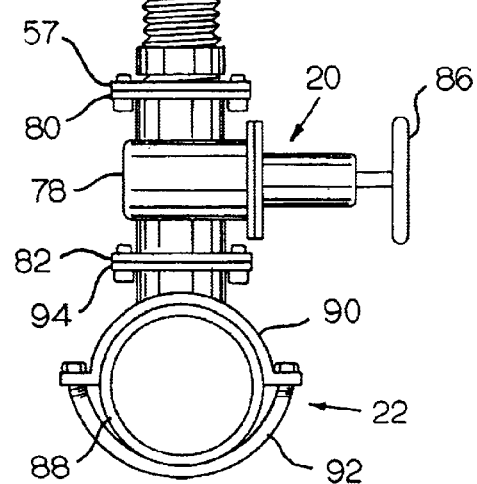
FIG. 2

HOT TAPPING TOOL

BACKGROUND OF THE INVENTION

This invention relates to tools and apparatus for cutting into existing lines carrying fluids such as gas or water under pressure for the purpose of adding additional lines to carry such fluids.

In a typical fluid transport system, such as the system supplying water to an average neighborhood, a main water line is buried underground. Branch lines draw water from this main line and deliver water to homes through out the neighborhood. When a new home or other facility is constructed in the neighborhood, it is necessary to connect (or "tap") the new branch line into the main line. It is imperative that the connection be made without disrupting water service to the other existing homes in the neighborhood. Such a connection under pressure is called a "hot tap" or "live tap".

There are various techniques and instruments that may be used to accomplish the hot tapping of a main line. One example may be found in U.S. Pat. No. 4,902,174 that issued on Feb. 20, 1990 and is assigned to Cliffside Utility Contractors Ltd. As described in the patent, the first step is to secure a "saddle" to the pipe. The saddle is a device that surrounds the pipe and provides a recessed area containing a seal which is flat or otherwise matches the curvature of the pipe. The saddle typically has a threaded collar projecting away from the pipe at the location of the seal, as well as an opening such that a cutting device can pass through the collar to cut into the pipe. A valve device is mounted to the saddle and the hot tapping device mounted to the valve device. Once the cut has been made into the pipe, the hot tapping device is withdrawn and the valve is closed. The device then can be removed, the branch line attached to the valve device, and the valve opened placing the branch line in fluid communication with the main line.

One problem associated with the prior art is the buildup of fluid which has "leaked" into the interior of the tool during the cutting operation. Additionally, it has been noted that the cutting operation often leaves undesired residue within the main pipe itself. It is therefore a paramount object of the present invention to provide for a hot tapping tool that is easy to operate and has few moving parts, minimizes and prevents escaping of fluids from the line being cut during the cutting operations, and to minimize or other wise reduce problems caused by cutting debris that is frequently left following a cutting operation in the pipe line itself. This and other objects of the present invention that will become apparent upon a reading of the detailed description with the appended drawings are addressed by the present invention as described below.

SUMMARY OF THE INVENTION

The present invention involves an improvement to a hot tapping tool adapted to be secured to and cutting into a pipe line carrying a fluid under pressure. The tool generally includes a housing, a shaft supported at spaced locations for rotation and axial movement within the housing, and a cutting device secured to one end of the shaft for cutting into the pressurized pipe line. The tool has a first fluid sealing member sealing an upper end of the housing against external leakage of fluid entering the tool during the cutting operation of the pressurized pipe and a second fluid sealing member sealing a lower end of the housing to minimize entrance of fluid into the tool during cutting of the pressurized pipe line. The tool is further provided with a pressure relief valve for allowing fluid under pressure within the housing to be released to the atmosphere. Still another important aspect of the present invention involves element for retaining a portion of the pressurized pipe cut from the pipe line by the device upon retraction of the device from the pipe line.

DESCRIPTION OF THE DRAWINGS

FIG. 1 is a side view of a hot tapping tool in accordance with the present invention;

FIG. 2 is a side view of a hot tapping tool clamped to a pipe line (shown in section) carrying a fluid under pressure;

FIG. 3A is an enlarged portion of FIG. 3 showing a connection which engages the tool shaft to the tool driving member;

FIG. 3B is an enlarged portion of FIG. 3 showing the connection of the hot tapping tool and valve assembly;

FIG. 3C is an enlarged portion of FIG. 3 showing the connection of the valve assembly to a collar assembly positioned on and clamped to the pipe line to be cut;

DETAILED DESCRIPTION OF THE PREFERRED EMBODIMENT

Figure 3:
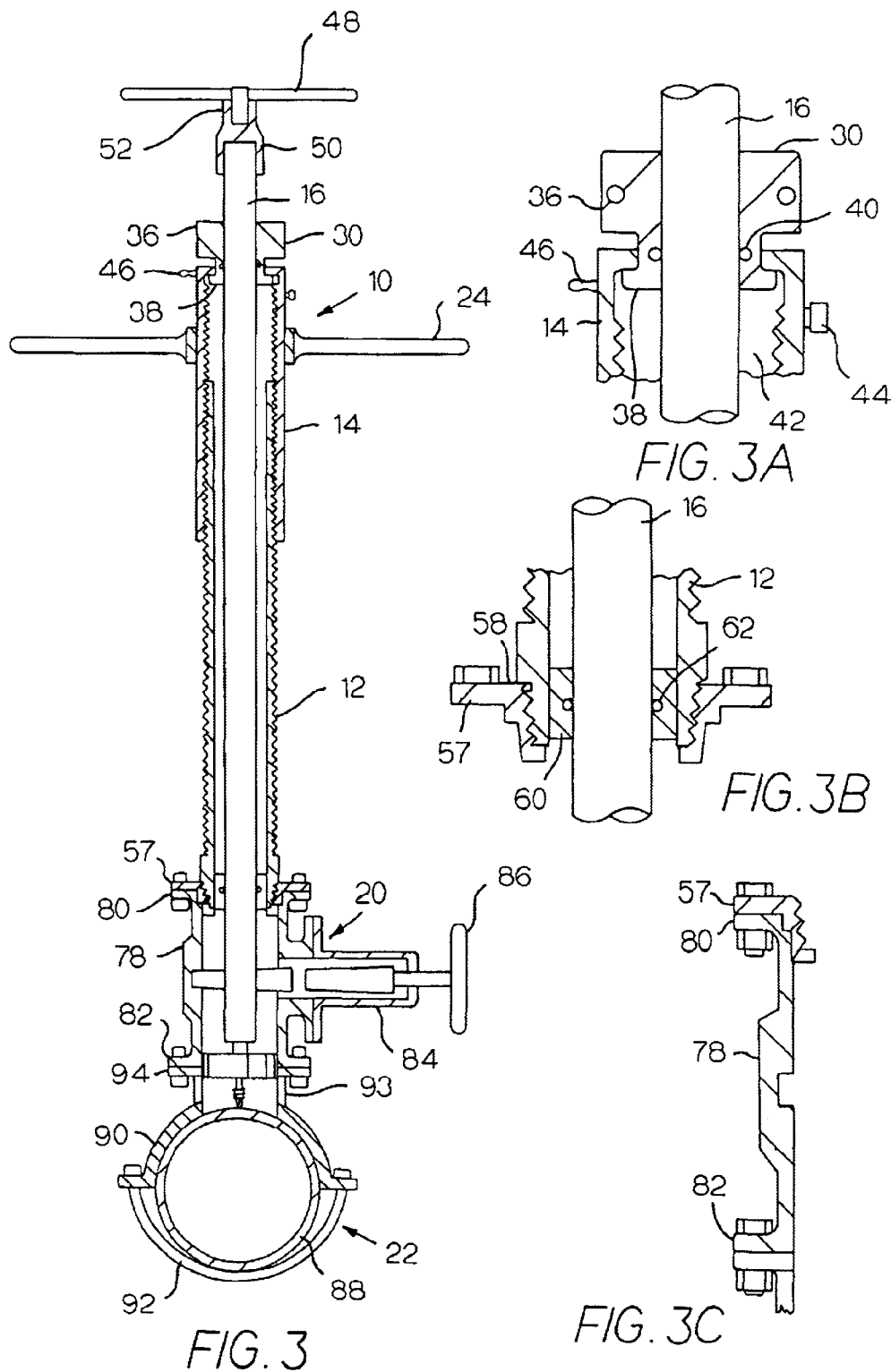
FIG. 3 is a side cross-sectional view of the hot tapping tool of FIG. 2 with the cutting device poised to cut into the pipe line.

The major components of the present invention are illustrated by the views provided in FIGS. 1–3 in which a hot tapping tool is depicted generally by the character numeral 10 and comprises an externally threaded tube 12, an internally threaded tube 14, a shaft 16, and a cutter assembly 18. As best seen in FIG. 3, the tube 12 threadedly engages threaded tube 14 along a portion of its length while the lower end of shaft 16 is removably secured to cutter assembly 18. In FIGS. 2 and 3, the hot tapping tool 10 is illustrated as being secured to a valve assembly 20 and a clamping assembly 22.

A manually operated drive wheel 24 is removably secured or clamped to a selected position along the outer periphery of the tube 14 by a pair of set screws 26, 28 (seen in FIG. 1). An annularly shaped flanged collar clamp 30 serves to operably connect the shaft 16 to the tube 14 as perhaps best illustrated by the sectional view of FIG. 3 by a collar 30 clamped to the shaft 16 by a pair of bolts 32, 34 and engaging the end of the tube 14 by the paired upper and lower flanges 36, 38. Rotation of the drive wheel 24 then rotates the tube 14 about tube 12, causing tube 14 to move axially up and down tube 12 while simultaneously imparting the same rotation and axial movement to the shaft 16. As is illustrated in the expanded sectional view of FIG. 3A, the collar 30 is additionally provided with groove to accept an O-ring 40 that provides a seal against the leakage of any fluid that may enter into the internal volume 42 defined by the various components of the tool 10. When desired, the build up of fluid pressure within the volume 42 may be manually vented by depression of the release valve 44. A grease fitting 46 permits lubrication of the moving parts as desired.

In some instances it may be desirable to rotate shaft 16 directly. This can be done by hand or through the use of an electric motor coupled to the shaft 16. One mechanism for accomplishing this by hand is perhaps best seen in FIGS. 1 and 4. A coupling member 50 has a pair of bores 50a and 50b are keyed, respectively to the shaft 48a of the T-handle 48 and the upper end of the shaft 16. The coupling member could be secured by a pair of set screws (not shown) allowing the handle 48 and coupling member 50 to be easily removed and replaced when necessary. Alternatively, the shaft of the T-handle 48 may be provided with a bore that receives the upper end of shaft 16, thus eliminating the need for a coupling member 50.

Figure 6:
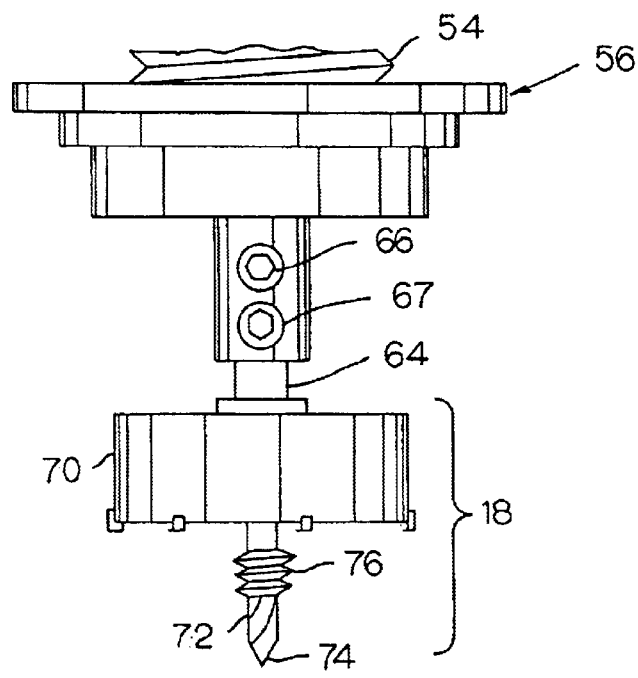
FIG. 6 is an enlarged side view of the cutting device illustrating a drill bit and a cutting saw.

The lower end of tube 12 may be tapered and fitted with additional threads 54 that serve to engage an upper internally threaded and tapered boss 58 of a valve adapter 56. (On small threaded valves, it may not be necessary to use the threaded valve adapter 56.) The lower end of tube 12 is also provided with a shaft 16 positioning member 60 that has a groove for receiving an O-ring 62 to minimize entrance of fluid into the internal volume 42 of the tool 10 when engaging in a pressurized pipe cutting operation. As best seen in FIG. 6, the lower end of shaft 16 terminates in a bore adapted to receive the shaft 64 of the cutter assembly 18. A pair of set screws 66, 68 secure the shaft 64 within the bore of shaft 16. The cutter assembly 18 comprises a cutter saw 70 fixed to shaft 64 and a bit 72 provided with pilot drill 74 at the end thereof and self tapping threads 76.

Reference is made to FIG. 3 in which the valve adapter 56 (seen only in FIG. 1) is shown seated within and bolted or appropriately secured to a valve seat 78 of the valve assembly 20. The valve seat 78 is provided with upper and lower annular flange seats 80 and 82. Upper flange seat 80 is illustrated as being bolted to flange 57 of the valve adapter 56. The valve 84 is then appropriately fixed to the valve seat 78 so that its bore that receives shaft 16 can be closed by manual manipulation of handle 86 when the shaft 16 and cutter assembly 18 are completely withdrawn. The lower flange seat 82 is adapted to be bolted or otherwise secured to flanged saddle or clamping assembly 22. In FIGS. 2 and 3, the clamping assembly 22 is depicted as being clamped about a pipe line 88 using a pair of collars 90 and 92 that are bolted together so that upper collar is in an essentially fluid tight relationship about line 88. Collar 90 is further provided with a cylindrical member 93 with a bore and an annular lip flange 94 that is positioned against and bolted to the lower flange seat 82 of the valve seat 78.

Figures 4, 5:
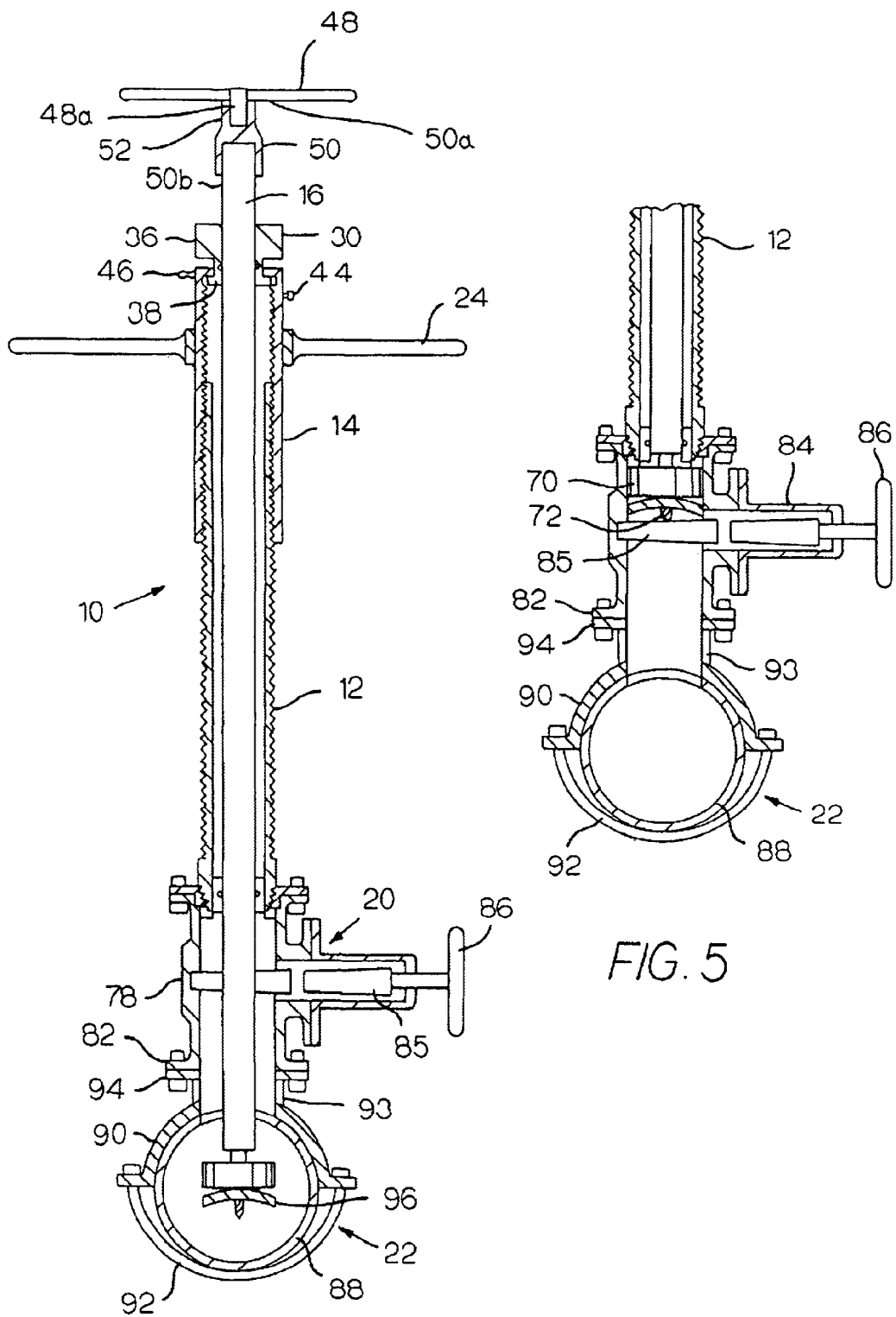
FIG. 4 is a side cross-sectional view of the hot tapping tool of FIG. 2 with cutting device in an extended position following the cutting operations.
FIG. 5 is a sectional cross-sectional view of a portion of the hot tapping tool showing the cutting device in a retracted position following a cutting operation.
Figure 7:
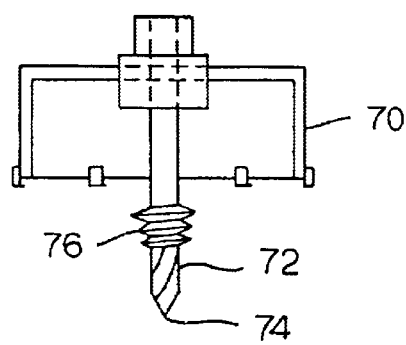
FIG. 7 is a side view similar to FIG. 6 with the cutting saw shown in side section to illustrate the mounting to the drill bit.
Figure 8:
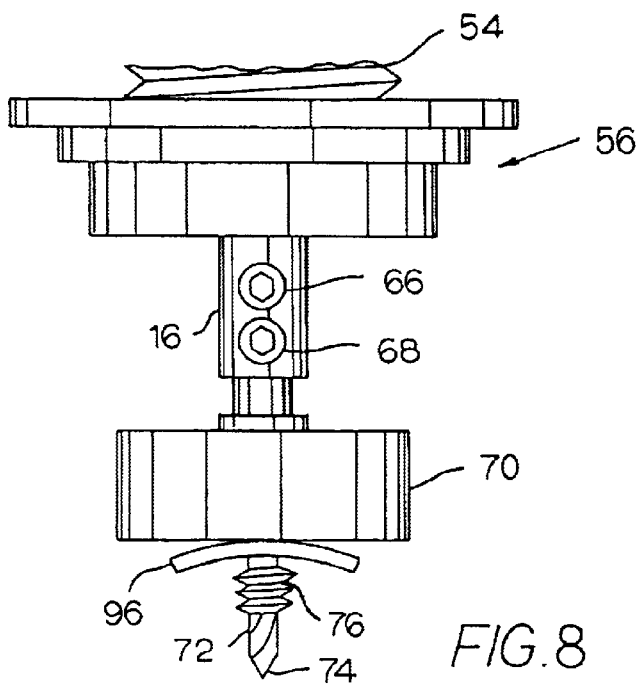
FIG. 8 is a view similar to FIG. 6 depicting a cutting piece or coupon attached to the cutting device following a cutting operation.

In operation, the tool 10 is positioned as illustrated in FIG. 3 as being screwed into the valve adapter 78 which in turn is bolted to the valve assembly 20 that is itself secured to the clamping assembly 22 clamped about pipe line 88. The valve 84 must be in an open state with the valve element 84a retracted so as to completely open the bore of the valve adapter for the passage of the distal end of the shaft 16 and attached cutter assembly 18. In FIG. 3, the cutter assembly is illustrated as being poised to cut into pipe line 88. Because tube 12 is fixed with respect to the line 88, rotation of the handle 24 will cause tube 14, and thus shaft 16 and cutter assembly 18, to rotate about and move axially toward pipe line 88. Initially, the pilot drill 74 and then the self tapping threads 76 penetrate the walls of the pipe line 88. Finally the cutting saw 70 cuts a predetermined area out of the pipe line 88. The seal provided by O-ring 62 prevents significant escape of the fluid carried by the pipe line 88. FIG. 4 illustrates the location of the cutter assembly at this point in the operation. As is clearly shown in FIGS. 5, 6, and 7, the cutter assembly 18 also has a drill component or bit 72 secured to the end of the shaft and extending beyond the cutter saw 70. The bit 72 terminates into the pilot drill 74 with some intermediately positioned self tapping threads 76. As the shaft 64 rotates and moves toward the pipe line, the pilot drill 74 and the threads 76 being essentially co-axial with said shaft penetrate a mid-point of the area (coupon) of the pipe to be cut by the cutter saw 70. From FIG. 8, it may clearly be seen that the coupon 96 is held between the self tapping threads 76 and the cutter head 70 when the shaft 64 is withdrawn from the pipe line. While the above is preferred, other cutting members could be used such as a standard hole saw when desired.

Reversing the rotation of the drive wheel retracts the shaft 16, cutter assembly 18, and also the coupon 96. The retraction operation continues until the cutter assembly 18 is located above the opening in the valve adapter 78 receiving the valve element 85. The valve handle is then manually turned to close the valve sending the element 85 to completely close the bore in the valve adapter 78. This state of the operation is shown in FIG. 5. At this point, the tool 10 may be completely removed from the valve adapter 78 and the secondary pipe line secured in its place. Although the amount of pressurized fluid that may have leaked into the volume 42 through the seal of O-ring 62 is likely to be minimal, any such fluid can easily be removed by depressing valve 44 and equilibrating the internal pressure to atmospheric pressure. It is understood that various types of valves could be used including, for example, screw type bleeder valves as employed on brake calipers for automobiles.

In light of the discussion above, it should be appreciated that the present invention addresses the objectives set forth above. The tool is simple in operation, provides an effective way of cutting into an existing pressurized line without significant loss of fluids carried by the pressurized line during the cutting operation, and leaves minimal cutting debris within the pipe line when retracted and the cutting operation is completed. Those with ordinary skill in the art upon reading of the disclosure and appended figures will be able to devise other variations and modifications without departing from the spirit and scope of the claims.

What is claimed is:

1. A combination of a clamping and valve assembly adapted to be attached to a pipe line carrying a fluid under pressure and a hot tapping tool, removably secured within an externally threaded bore of said clamping and valve assembly, having a shaft supported for rotation and axial movement and a cutting device secured at one end of said shaft for cutting into said pipe line, said improvement comprising, (a) a first externally threaded tubular member threadedly secured at one end thereof to said bore, (b) a second internally threaded tubular member threadedly engaged to said first member and adapted to be rotated and axial moved with respect to said first member, (c) a connecting member operably connecting said second member to said shaft for imparting axial motion thereto thereby permitting said cutting device to be positioned adjacent the pipe line for cutting into the pipe line, said first, second, and connecting members collectively forming a housing about said shaft while said first and second members are spaced from said shaft, said shaft being supported at spaced locations for rotational and axial movement within said housing, and (d) a pair of spaced sealing members abutting said shaft and positioned within said housing near respective spaced supporting locations thereof thereby minimizing entrance into and escape from said housing of pressurized fluid escaping from the pipe line during cutting thereof.

2. The combination of claim 1 in which said cutting device is a tubular member with a cutting edge and further has a separate component that positively secures a portion cut from said pipe line when said cutting device is retracted therefrom.

3. The combination of claim 1 including a pressure relief valve for relieving pressure within said housing to the atmosphere.

* * * * *